FRED. L. MILLER.

Improvement in Soldering Apparatus.

No. 4.950. Reissued June 18, 1872.

Witnesses
Fred Haimer
R R Rabeau

Fred. L. Miller.

UNITED STATES PATENT OFFICE.

FREDERICK L. MILLER, OF BROOKLYN, NEW YORK.

IMPROVEMENT IN SOLDERING APPARATUS.

Specification forming part of Letters Patent No. 120,991, dated November 14, 1871; reissue No. 4,950, dated June 18, 1872.

*To all whom it may concern:*

Be it known that I, FREDERICK L. MILLER, of Brooklyn, in the county of Kings and State of New York, have invented a new and Improved Apparatus for Soldering Cans and similar metallic articles; and I do declare that the following is a full, clear, and exact description thereof, reference being had to the accompanying drawing forming a part of this specification.

The invention is principally designed for soldering the tops and bottoms to the bodies of cans, such as are used for holding fruit, paint, &c. My invention embraces several features, the first of which consists in a revolving soldering bed or socket, which is formed to receive and hold the article to be soldered, and which is placed over a fixed flame, or other suitable means of heating, in such a position that the joint of the can, on the inside, is so heated by the contact of the can on its outside with the heated bed on which it is placed that a piece of solder placed within the can is melted, and the soldering is effected on the inside of the can by the revolution of the bed which carries the can, without the necessity of applying to the solder, or to the article to be soldered, irons independently heated, or of melting the solder before it is brought in contact with the article to be soldered, or of introducing into the can a flame of gas from a blow-pipe or other independent source of heat. The best way to effect this operation embraces the second feature of my invention, and is to construct the said bed in an inclined position, so that its revolution causes the melting solder to run all around the joint. My invention also embraces certain means of heating the said soldering-bed so as to melt the solder by application of heat to the parts to be soldered.

Figure 1:
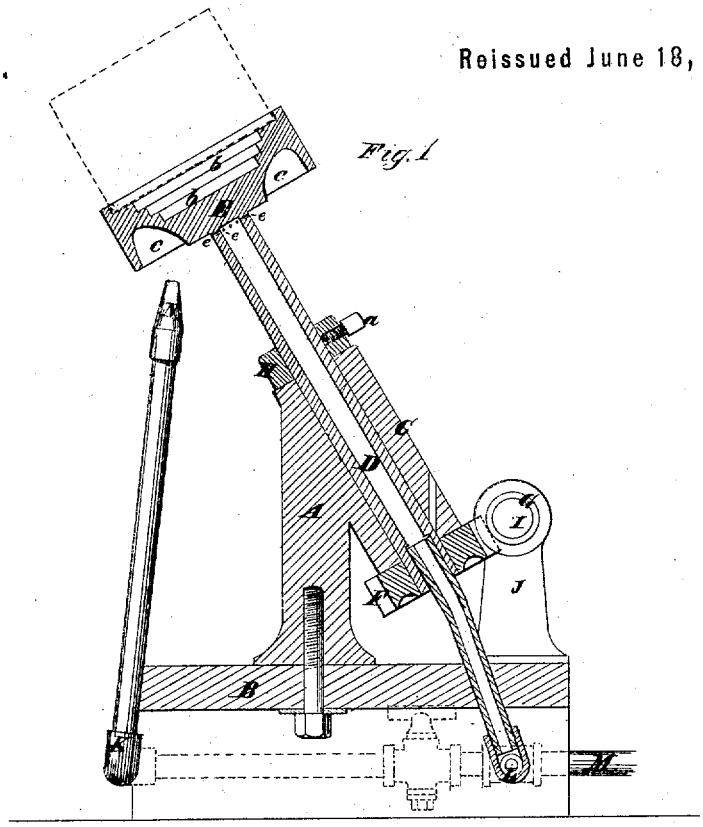
Figure 2:
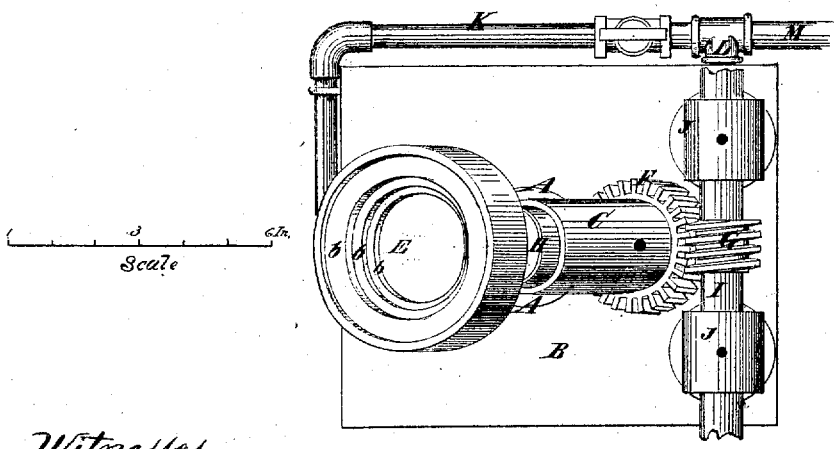

In the accompanying drawing, Figure 1 is a central vertical section of my soldering apparatus, and Fig. 2 is a plan of the same.

Similar letters of reference indicate corresponding parts in both figures.

A is a post or column, which is bolted or otherwise secured to a bed-plate or other suitable support, and has formed on its upper end an inclined bearing, C, for the reception of a shaft, D, to the upper end of which is secured the revolving soldering-bed E, which consists of a stout disk or plate of metal, in the upper surfaces of which are a series of circular recesses, *b b*, arranged one within another, concentric with the axis of the shaft, the bottoms of the recesses forming a series of annular seats for the reception of cans of different sizes. In the bottom of said bed there is a deep annular groove, *c*, to facilitate the heating of the bed by a flame of gas, or heat otherwise applied underneath it. The shaft D is hollow and open at the bottom, but closed at the top, except that it has minute openings *e e* in its sides, immediately under the soldering-bed, for the issue in jets of gas or air admitted at the bottom. The shaft is supported on the top of the bearing C by a collar, H, secured to it by a set-screw, and it is furnished at the bottom with a worm-gear, F, gearing with an endless screw, G G, on a horizontal driving-shaft, I, which works in bearing J J on the plate B. M is a gas-pipe, intended to be connected with the main, and having two branches, K and L, the latter of which enters the lower end of the shaft D, and the former leads upward and is furnished with a burner, N, directly under the groove *c* in the revolving soldering-bed; the said groove *c* being used to confine the flame from spreading away from the neighborhood of the joint to be soldered, the depth of the rim serving to accumulate the heat under the joint.

The operation or process of manufacture is as follows: The body and top or bottom of the can to be united are put together, and a piece of solder, with resin or acid for a flux, are put in the can, which is then placed in one of the seats *b b* of the bed E, as shown by the dotted outline in Fig. 1. As soon as the solder is melted by the heat imparted to the joint by the heat of the bed the combined inclination and revolution of the bed cause it to flow round and fill the seam. The gas by which the bed E is heated may be introduced from the pipe M through both branches K and L. That introduced through the branch L passes up the shaft D and issues in jets through the holes *e e* and burns directly under the bed E, and that introduced through the pipe K, being ignited at the burner N, burns in contact with the groove *c* in the bed. Either branch K or L may be used separately for gas, and in case K only is used for gas, cold air may be introduced through L to cool the shaft. In practice I shall arrange a hood-like box adjoining the bed-plate to catch the smoke and flames arising from the combustion and convey them away, and it will also serve to warm the cans previously to placing them on the box. Two or more of the soldering machines or apparatus may be arranged side by side on one frame, and be driven by a corresponding number of endless screws, G, on the shaft I.

I do not claim as my invention a revolving socket which shall hold a can while its joint is turned around in a bed of molten solder; neither do I claim the arrangement of a revolving socket which shall hold the can while a ring of solder is melted around its joint by the flame from a blow-pipe or by an independent soldering-iron; nor do I claim a stove with a stationary inclined top upon which a can may be placed and heated, and then turned around by hand independently of the fixed bed on which it is held while being heated; but

What I claim as my invention, and desire to secure by Letters Patent, is—

1. The arrangement of a soldering-bed which is made to revolve so that the soldering is effected on the inside of a can by the melting there of a lump of solder from heat applied outside the can, in the manner substantially as described.

2. The construction of the said soldering-bed so that it will revolve in an inclined position, causing the solder to flow, by its gravity, around the joint of the can as it turns, substantially as herein described.

3. The application to a soldering apparatus of a hollow shaft, D, having perforations or openings near its upper end, when used in combination with a soldering-bed, substantially as and for the purposes herein specified.

4. The construction of a soldering-bed with a groove, or its equivalent, on its under side, substantially as and for the purposes described.

FRED. L. MILLER.

Witnesses:
HENRY S. BELLOWS,
JAMES F. MCILVAINE.